United States Patent
Suchter et al.

(10) Patent No.: US 9,542,536 B2
(45) Date of Patent: Jan. 10, 2017

(54) SUSTAINED DATA PROTECTION

(75) Inventors: Sean Andrew Suchter, Los Altos Hills, CA (US); Ho John Lee, Palo Alto, CA (US); Charles Carson, Redmond, WA (US); Scott Banachowski, San Francisco, CA (US); Yuri Romanenko, Redwood City, CA (US); Eric Wai Ho Lau, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 114 days.

(21) Appl. No.: 13/350,426

(22) Filed: Jan. 13, 2012

(65) Prior Publication Data
US 2013/0185811 A1    Jul. 18, 2013

(51) Int. Cl.
H04L 29/06        (2006.01)
G06F 21/10        (2013.01)

(52) U.S. Cl.
CPC .................................... G06F 21/10 (2013.01)

(58) Field of Classification Search
USPC ... 726/1, 2, 5, 18, 27–30; 709/225; 707/694, 707/705, 758; 710/28
See application file for complete search history.

(56) References Cited

U.S. PATENT DOCUMENTS

| | | | |
|---|---|---|---|
| 5,280,619 A | 1/1994 | Wang | |
| 6,839,843 B1 | 1/2005 | Bacha | |
| 7,593,942 B2 | 9/2009 | Sack | |
| 7,818,581 B2 | 10/2010 | Lacan | |
| 2004/0022390 A1 | 2/2004 | McDonald | |
| 2005/0039034 A1 | 2/2005 | Doyle et al. | |
| 2005/0262196 A1 | 11/2005 | Mueller | |
| 2006/0155742 A1 | 7/2006 | Stanev | |
| 2007/0300306 A1 | 12/2007 | Hussain | |
| 2008/0267403 A1 | 10/2008 | Boult | |
| 2009/0254972 A1* | 10/2009 | Huang et al. | 726/1 |
| 2009/0300190 A1 | 12/2009 | Williamson et al. | |
| 2010/0083277 A1 | 4/2010 | Malladi et al. | |

(Continued)

OTHER PUBLICATIONS

Tal, Sivan, "Ensuring access control in virtualized storage environments"—Retrieved Date: Jan. 3, 2012 Proceedings: IBM, http://domino.watson.ibm.com/comm/research.nsf/pages/r.storage.CbCS.html.

(Continued)

Primary Examiner — Joseph P Hirl
Assistant Examiner — Leynna Truvan
(74) Attorney, Agent, or Firm — Jessica Meyers; Tom Wong; Mickey Minhas

(57) ABSTRACT

Among other things, one or more techniques and/or systems are provided for sustained data protection. In particular, a data protector may define a set of access levels associated with content within data using a set of access policies (e.g., a partial access level to inventory data for an inventory server, a full access level to inventory data and billing data for a shopping website server, etc.). The data protector may secure (e.g., encrypt) the data to create protected data, so that clients may be unable to access content of the protected data without obtaining access through the data protector. In this way, the data protector may selectively provide clients with access to content within the protected data according to respective access levels for the different clients (e.g., access to inventory data, but not billing data, may be provided to the inventory server by the data protector).

20 Claims, 7 Drawing Sheets

(56) References Cited

U.S. PATENT DOCUMENTS

| | | |
|---|---|---|
| 2010/0169565 A1 | 7/2010 | Kaneko |
| 2011/0119481 A1* | 5/2011 | Auradkar et al. ............ 713/150 |
| 2011/0191862 A1* | 8/2011 | Mandava et al. ............... 726/28 |
| 2012/0102334 A1 | 4/2012 | O'Loughlin et al. |
| 2013/0160144 A1 | 6/2013 | Mok et al. |

OTHER PUBLICATIONS

Taylor; et al., "Implementing role based access control for federated information systems on the web"—Published Date: Feb. 1, 2003, Proceedings: ACSW Frontiers '03 Proceedings of the Australasian information security workshop conference on ACSW frontiers 2003—vol. 21, pp. 87-95, http://dl.acm.org/citation.cfm?id=827998.

Cutillo; et al., Privacy Preserving Social Networking through Decentralization—Published Date: Feb. 2009—(02-04) Proceedings: Wireless on-Demand Network Systems and Services, 2009. WONS 2009, pp. 145-152 http://ieeexplore.ieee.org/stamp/stamp.jsp?tp=&arnumber=4801860.

"Access Control Mechanisms"—Retrieved Date: Jan. 2, 2012, http://msdn.microsoft.com/en-us/library/ms733106.aspx.

"Requirements for and Evaluation of RMI Protocols for Scientific Computing", Madhusudhan Govindaraju, Aleksander Slominski, Venkatesh Choppella, Randall Bramley and Dennis Gannon, Nov. 4-10, 2000, ACM/IEEE 2000 Supercomputing Conference, reprinted from the Internet at: http://www.cs.binghamton.edu/~mgovinda/publications/papers.sc00.pdf, pp. 1-26.

"Object Serialization and Deserialization Using XML", J.-M. Le Goff, H. Stockinger, I. Willers, R. McClatchey, Z. Kovacs, P. Martin, N. Bhatti and W. Hassan, May 23, 2001, Proceedings: physics/0105083; CERN-CMS-NOTE-2001-025; CMS-NOTE-2001-025, reprinted from the Internet at: http://cdsweb.cern.ch/record/501204/files/0105083.pdf, pp. 1-14.

"Security in Object Serialization", 2004, reprinted from the Internet at: http://docs.oracle.com/javase/1.5.0/docs/guide/serialization/spec/security.html., 5 pgs.

"Security Considerations for Data", Aug. 2, 2012, reprinted from the Internet at: http://msdn.microsoft.com/en-us/library/ms733135.aspx, 21 pgs.

\* cited by examiner

SUSTAINED DATA PROTECTION

BACKGROUND

Many users and companies implement data protection techniques to securely store and/or protect access to data. In one example, an email service may protect access to emails using a username/password technique. In another example, a file server may protect access to files using an encryption technique and/or an authentication technique. Conventional data protection schemes generally perform access control before data retrieval. For example, a request from a client to access protected data may be evaluated by an access control technique to verify the client has permission to access the protected data before the protected data is provided to the client. Upon verification of the client, the protected data may be provided to the client in an unprotected form. Unfortunately, access control may not be enforced after retrieval of the data from storage.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for sustained data protection are provided herein. That is, protection of data may be sustained even after retrieval of the data (e.g., after a client retrieves the data from storage). In one example, data may be received from a first client requesting protection of the data. For example, the first client may request protection of social network data comprising phone numbers, status updates, recommendations made by users, and/or personal contact information of users. The first client may be evaluated to determine whether the first client has permission to create protected data from the data and/or content therein. For example, the first client may be evaluated against a set of write permissions comprising a write permission specifying that the first client has permission to create protected data from phone numbers, status updates, and recommendations made by users. However, the write permission may not grant the first client permission to create protected data from the personal contact information of users. Accordingly, the phone numbers, status updates, and recommendations made by users, but not the personal contact information of users, may be used to create protected data.

One or more access levels may be specified for content within the data using a set of access policies. For example, a full access level may be specified for a client machine logged in by Bill; a partial access level to recommendations made by social network friends of Dan may be specified for client applications acting on behalf of Dan; a partial access level to phone numbers within a phone book of Emily may be specified for client applications acting on behalf of Emily; etc. The data may be secured to create protected data. For example, the data may be encrypted and/or constrained by a time-constraint (e.g., the data may be encrypted with an encryption key unavailable to one or more clients). Encrypting the data and/or controlling a client's ability to selectively produce protected data (e.g., via write permissions) may be an indication to clients obtaining the protected data that the integrity of the protected data may be trusted and/or may protect against unauthorized production of and/or access to content within the protected data. In this way, the protected data may be provided to the first client while protection of the data is sustained.

A second client may request access to content within the protected data (e.g., the second client may be acting on behalf of Dan). An access level to the protected data for the second client may be determined based upon evaluating the client against a set of access policies. For example, a first policy may specify that client applications acting on behalf of Dan may be granted a partial access level to recommendations made by social network friends of Dan within the protected data (e.g., one or more recommendations may relate to reviews provided by friends of Dan for local restaurants, which may be used by the second client to populate a restaurant suggestion web page with recommendations that may be relevant to Dan). In this way, content comprising recommendations made by friends of Dan (e.g., but not phone numbers, status updates, and/or other content within the protected data) may be provided to the second client according to the access level (e.g., access may be selectively provided to one or more portions/content of the data). It may be appreciated that the protected data may remain protected after the client is provided with the content. That is, data protection may be sustained because access to content within the protected data may continue to be controlled (e.g., by a data protector) for the second client and/or other clients.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
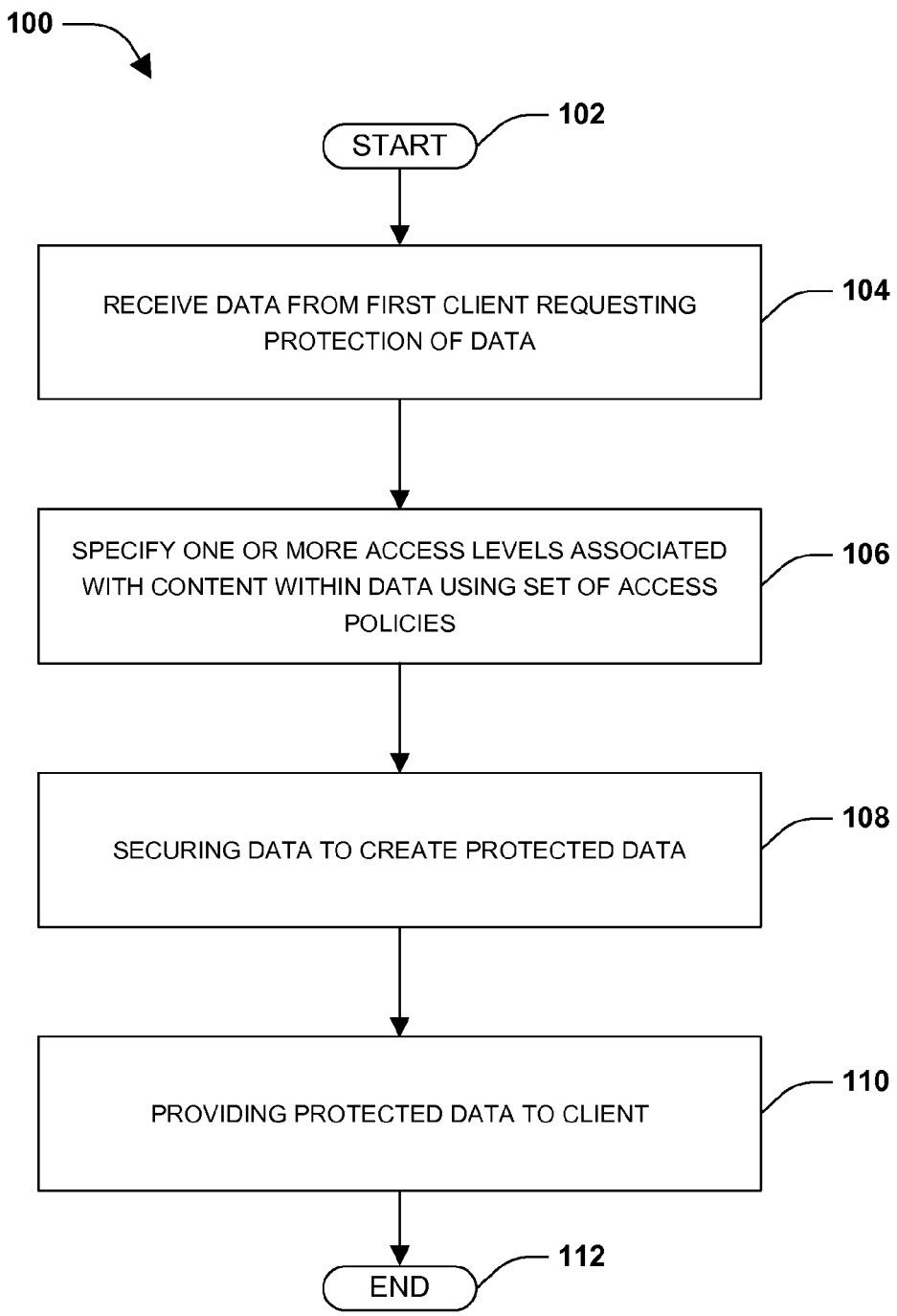
FIG. 1 is a flow chart illustrating an exemplary method of providing sustained data protection.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Conventional data protection techniques generally verify whether a client has access rights to data before the data is provided to the client. For example, an online shopping service server may submit a data query to a storage system to retrieve credit card data of a user. A data retrieval storage layer of the storage system may verify whether the online shopping service server has rights to access the credit card data of the user. Upon verification, the storage system may provide the credit card data to the online shopping service server. Once the online shopping service server has obtained the credit card data, however, further protection of the credit card data may be unavailable (e.g., which may be problematic).

Accordingly, one or more systems and/or techniques for sustained data protection are provided herein. In one example, a data protector (e.g., a data protection layer) may be configured to create protected data by securing the data (e.g., encrypting the data so that one or more clients may not have access to the protected data, except through the data protector) and/or specifying access levels for content within the data using a set of access policies (e.g., an online shopping server may have full access to shopping history data and credit card data, whereas a shopping history reporting server may merely have access to shopping history data within the protected data (e.g., not credit card data)). The data protector may be configured to provide a client with access to content within the protected data based upon evaluating the client against a set of access policies to determine an access level (e.g., full access, partial access to particular content, access denied, etc.) for the client. In this way, the data protector may provide content within the protected data to the client according to the access level. It may be appreciated that sustained data protection may be achieved because the protected data may still be protected and/or inaccessible to the client and/or other clients without access provided by the data protector. In one example, the data protector may be implemented within a distributed environment (e.g., within a data protection layer implemented across one or more clients of the distributed environment). In this way, the protected data may be distributed to one or more clients while maintaining data protection because such clients may be unable to access the protected data without access provided by the data protector.

One embodiment of providing sustained data protection is illustrated by an exemplary method 100 in FIG. 1. At 102, the method starts. At 104, data from a first client requesting protection of the data may be received. In one example, an online shopping service server may request shopping data (e.g., shopping history data, credit card data, inventory data, employee social security numbers, etc.) from a data retrieval layer of a storage system. Because the online shopping service server may intend to distribute the shopping data to one or more clients (e.g., a shopping history reporting server, a billing server, an inventory server, etc.), the online shopping service server may request protection of the shopping data once retrieved from a storage system (e.g., from a data protector external to the data retrieval layer). In one example, the first client may be evaluated to determine whether the first client has permission to create protected data from the data. It may be appreciated that in one example, varying levels of permission may be granted to various clients (e.g., a billing server may have permission to protect billing data and customer address data, but not employee data, while a payroll server may have permission to protect employee data, but not billing data and customer address data). For example, the first client may be evaluated against a set of write permissions comprising a write permission specifying that the first client has permission to protect shopping history data, credit card data, and inventory data. However, the write permission may not grant the first client permission to create protected data from employee social security numbers. Accordingly, the shopping history data, credit card data, and inventory, but not the employee social security numbers, may be used to create protected data.

At 106, one or more access levels associated with content within the data may be specified using a set of access policies. For example, a first access policy may specify that the shopping history reporting server may have access to shopping history data, the billing server may have access to shopping history data and credit card data, the inventory server may have access to inventory data, the online shopping service server may have access to all shopping data, and that other servers may have no access rights. In this way, a partial access level to shopping history data may be specified for the shopping history reporting server, a partial access level to shopping history data and credit card data may be specified for the billing server, a partial access level to inventory data may be specified for the inventory server, a full access level may be specified for the online shopping service server, and an access denied level may be specified for unknown clients.

At 108, the data may be secured to create protected data. In one example, the data may be encrypted using an encryption key unavailable to one or more clients so that the one or more clients may be unable to access content within the protected data (e.g., without access provided by a data protector). In another example, a time-constraint on the validity of the data may be specified (e.g., access may be provided by the data protector to a client requesting access at a time corresponding to the time-constraint). At 110, the protected data may be provided to the first client (e.g., made available to the first client and/or merely created on behalf of the first client).

In one example, the protected data may be made available to one or more clients (e.g., the shopping history reporting server, the billing server, the inventory server, and/or other servers). It may be appreciated that such clients may be unable to access content within the protected data without obtaining access through a data protector. Accordingly, a second client may request access to content within the protected data. In one example, the inventory server may request access to content within the protected data. The partial access level to the inventory data may be determined for the inventory server based upon evaluating the inventory server against the set of access policies. In this way, inventory data (e.g., but not shopping history data, credit card data, and/or other non-inventory data) may be provided to the inventory server. In another example, the billing server may request access to content within the protected data. The partial access level to the shopping history data and the credit card data may be determined for the billing server based upon evaluating the inventory server against the set of access policies. In this way, shopping history data and credit card data (e.g., but not inventory data and/or other non-billing data) may be provided to the billing server. In another example, full access to content within the protected data may be provided to the online shopping service server based upon evaluating the online shopping service server against the set of access policies. In another example, an advertising server may be denied access to content within the protected data based upon evaluating the advertising server against the set of access policies. At 112, the method end.

Figure 2:
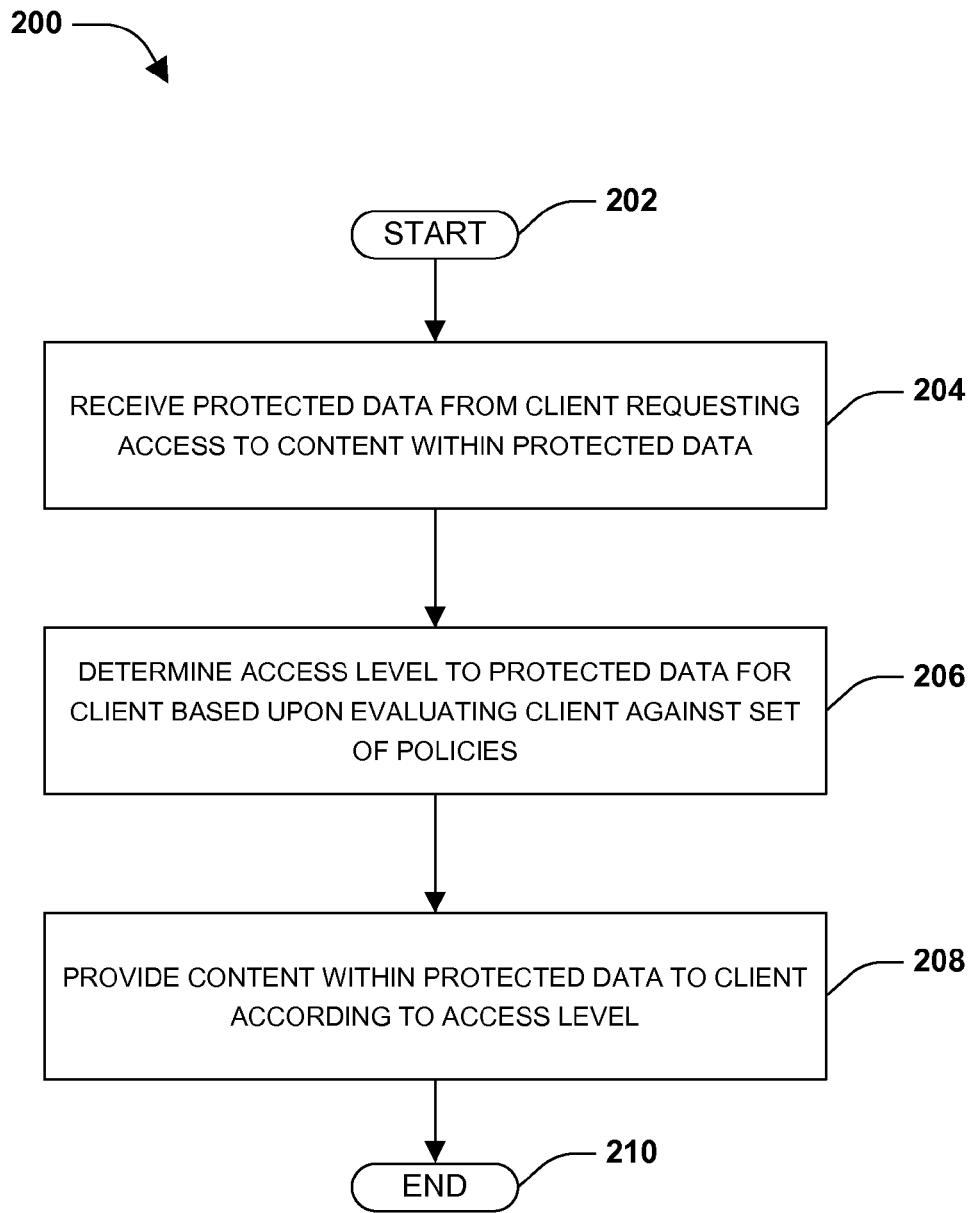
FIG. 2 is a flow chart illustrating an exemplary method of providing sustained data protection.

One embodiment of providing sustained data protection is illustrated by an exemplary method 200 in FIG. 2. At 202, the method starts. At 204, protected data may be received from a client requesting access to content within the protected data. For example, an inventory server may be associated with protected shopping data (e.g., protected shopping data comprising shopping history data, credit card data, and inventory data). However, the inventory server may be unable to access content within the protected shopping data without access provided by a data protector (e.g., a data protection layer external to a data retrieval storage layer that may have initially provided the shopping data from a storage system) because the protected shopping data may be encrypted and/or secured using a time-constraint. Accordingly, the protected shopping data may be received (e.g., by the data protector) from the inventory server requesting access to content within the protected shopping data.

At 206, an access level to the protected data may be determined for the client based upon evaluating the client against a set of access policies. In one example, an access policy may specify whether a client machine, a client application, and/or a user (e.g., using the client), etc. have permission/rights to access a portion of the content within the protected data and/or whether a time constraint for access is met. The access level may comprise a full access level, a partial access level to less than all of the content, and/or an access denied level. In one example of determining the access level, a partial access level to inventory data within the protected shopping data may be determined for the inventory server based upon evaluating the inventory server against an access policy specifying that the inventory server has access rights to inventory information. At 208, content within the protected data may be provided to the client according to the access level. For example, the inventory data (e.g., but not the shopping history data nor the credit card data) within the protected data may be provided to the inventory server according to the partial access level to inventory data. In one example, the protected shopping data may be decrypted and/or a time-constraint may be verified before the inventory data is provided to the inventory server. It may be appreciated that the protected shopping data may remain protected because the protected shopping data may be inaccessible to the inventory server and/or other clients without access provided by the data protector (e.g., merely providing the inventory data to the inventory server from the protected shopping data does not grant another client access to the inventory data and/or other content within the protected shopping data without first obtaining access through the data protector).

It may be appreciated that clients may be provided with various types of access to content within the protected data (e.g., a billing server may be provided with access to shopping history data and/or credit card data, but not inventory data; a payment application acting on behalf of user Dan may be provided with access to shopping history data and/or credit card data for Dan; etc.). In one example, the protected data may be received from a second client requesting access to content within the protected data. For example, a shopping history reporting server may request access to content within the protected shopping data. A second access level to the protected data may be determined for the second client based upon evaluating the second client against the set of access policies (e.g., the second access level for the second client may be the same or different than the access level for the client). For example, a partial access level to shopping history data may be determined for the shopping history reporting server based upon evaluating the shopping history reporting server against an access policy specifying that the shopping history reporting server has access rights to shopping history data. Second content within the protected data may be provided to the second client according to the second access level (e.g., the second content provided to the second client may be the same or different than the content provided to the client). For example, shopping history data may be provided to the shopping history reporting server based upon the partial access level to shopping history data. It may be appreciated that the protected shopping data may remain protected because the protected shopping data may be inaccessible to the shopping history reporting server and/or other clients without access provided by the data protector (e.g., merely providing the shopping history data to the shopping history reporting server from the protected shopping data does not grant another client access to the shopping history data and/or other content within the protected shopping data without first obtaining access through the data protector). At 210, the method ends.

Figure 3:
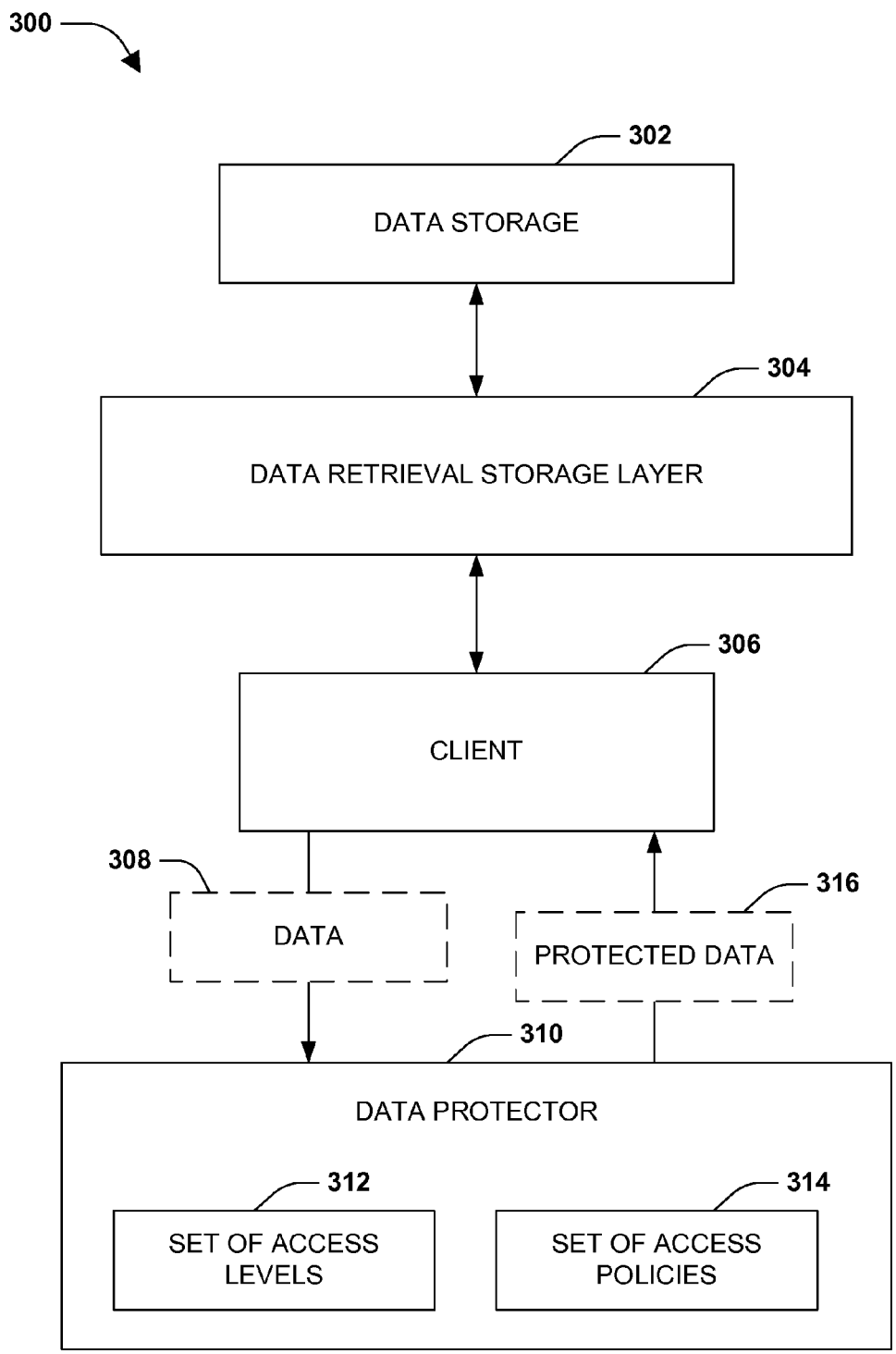
FIG. 3 is a component block diagram illustrating an exemplary system for providing sustained data protection.

FIG. 3 illustrates an example of a system 300 configured for providing sustained data protection. The system 300 may comprise a data protector 310. The data protector 310 may be configured to secure data 308 to create protected data 316 (e.g., so that clients may be unable to access content within the protected data 316 without access provided by the data protector 310) and/or to provide clients with access to content within the protected data 316.

In one example, a client 306 may access data storage 302 comprising various data. For example, a search result server may access a database comprising social network data because the search result server may be configured to provide search results to users that may incorporate information, such as social network data, associated with friends of such users (e.g., in response to a user searching for restaurants, the search result server may provide restaurant search results comprising restaurant recommendations/reviews made by friends of the user). The client 306 may retrieve data 308 (e.g., social network data comprising recommendations made by users, phone numbers saved by users, friend lists of users, status updates of users, photo information of users, etc.) from the data storage 302 using a data retrieval storage layer 304.

Accordingly, the client 306 may request sustained data protection for the data from the data protector 310 (e.g., the data protector 310 may receive the data 308 from the client 306 requesting the protection). The data protector 310 may be configured to define a set of access levels 312 associated with content within the data 308 using a set of access policies 314. The set of access policies 314 may specify access permissions associated with user identifiers, client application identifiers, client machine identifiers, etc. For example, an access policy may specify that a client acting on behalf of Emily may have permission to access social network data of Emily and friends of Emily (e.g., recommendations made by friends of Emily, status updates by friends of Emily, phone numbers within a phone book of Emily, Emily's friend list, etc.) Accordingly, a partial access level to social network data associated with Emily and friends of Emily may be defined.

The data protector 310 may be configured to secure the data 308 to create the protected data 316. For example, the data protector 310 may encrypt and/or time-constrain the data 308 to create the protected data 316, such that clients (e.g., client 306 and/or other clients not illustrated) may be unable to access content within the protected data 316 without obtaining access through the data protector 310. Moreover, prior to securing the data, the data protector (e.g., and/or another component) may be configured to evaluate the client against a set of write permission to determine whether the client has permission to protect one or more portions of the data. For example, if the client has permission to secure a first portion the data, but not a second portion of the data, then the first portion of the data may be included within the protected data, but the second portion of the data would not be included within the protected data. In this way, data protection for the protected data 316 may be sustained because access to content within the protected data 316 may be controlled by the data protector 310 (e.g., even after the protected data 316 is obtained by other clients).

Figure 4:
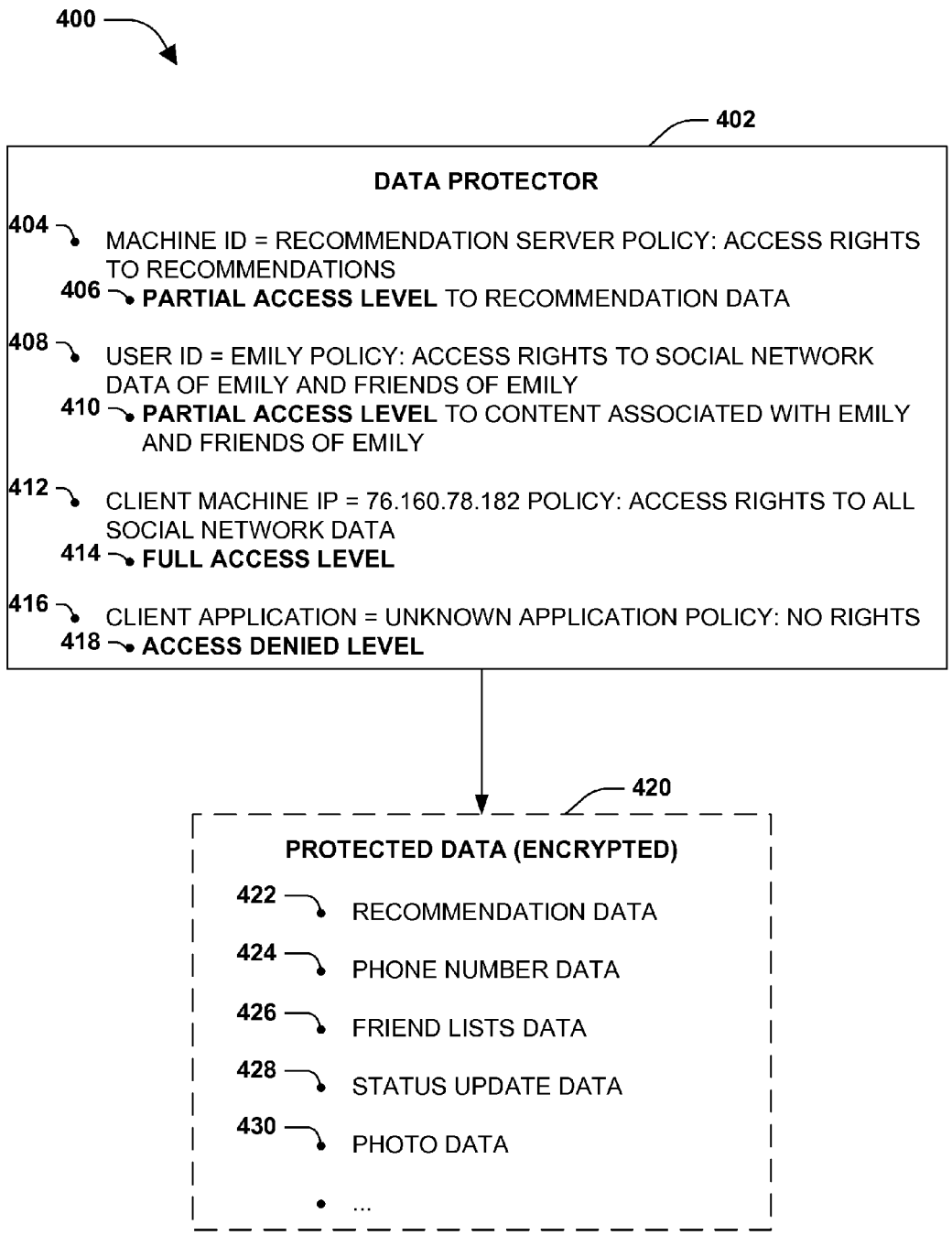
FIG. 4 is an illustration of an example of a data protector creating protected data.

FIG. 4 illustrates an example 400 of a data protector 402 (e.g., 310 of FIG. 3) creating protected data 420. The data protector 402 may have received a request to protect data (e.g., social network data comprising recommendation data 422, phone number data 424, friend lists data 426, status update data 428, photo data 430, and/or other social network data). The data protector 402 may specify one or more access levels associated with content within the data using a set of access policies. For example, a partial access level to recommendation data 406 may be specified based upon a first access policy 404 specifying that a recommendation server has access rights to recommendations. A partial access level to content associated with Emily and friends of Emily 410 may be specified based upon a second access policy 408 specifying that clients acting on behalf of Emily have access rights to social network data of Emily and friends of Emily. A full access level 414 may be specified based upon a third access policy 412 specifying that a client machine with an IP address of 76.160.78.182 has access rights to all social network data. An access denied level 418 may be specified based upon a fourth access policy 416 specifying that unknown applications have no access rights to social network data. In this way, the data protector 402 may provide content within the protected data 420 to a client according to an access level determined for the client based upon evaluating the client against the set of access policies.

Figure 5:
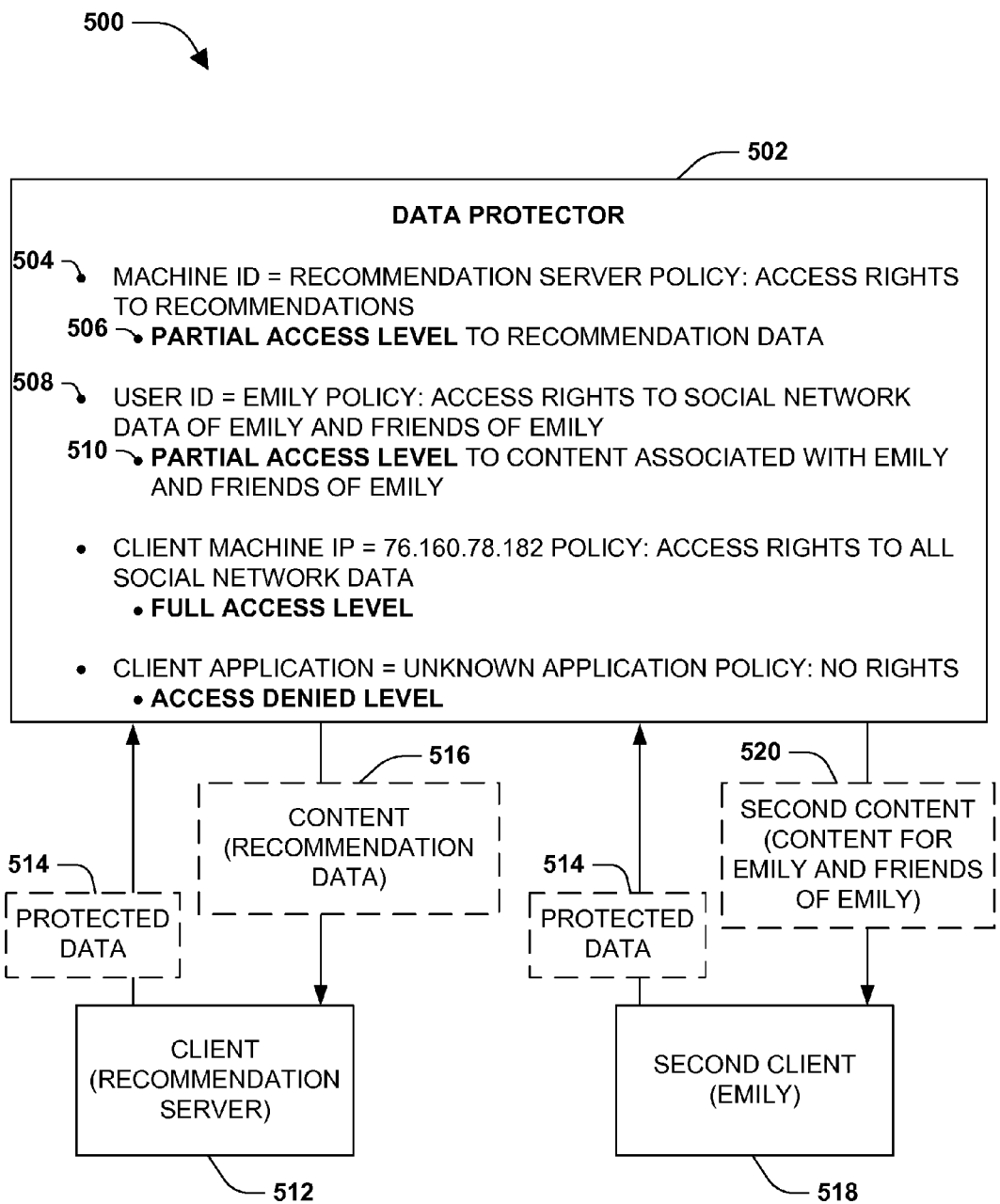
FIG. 5 is an illustration of an example of a data protector providing content within protected data to a client and second content within the protected data to a second client.

FIG. 5 illustrates an example 500 of a data protector 502 (e.g., 310 of FIG. 3) selectively providing content 516 within protected data 514 to a client 512 and second content 520 within the protected data 514 to a second client 518. The data protector 502 may be configured to provide clients with varying levels of access to content within the protected data 514 based upon a set of access policies. In one example, the protected data 514 may be received from the client 512 (e.g., a recommendation server configured to populate search results for a user with recommendations provided by friends of the user) that may be requesting access to content within the protected data 514. An access level to the protected data 514 may be determined for the client 512 based upon evaluating the client 512 against the set of access policies. For example, the recommendation server may be evaluated against a recommendation server policy 504 to determine a partial access level to recommendation data 506. In this way, content 516 within the protected data 514 may be selectively provided to the client 512. For example, recommendation data (e.g., but not other social network data) within the protected data 514 may be provided to the recommendation server (e.g., for incorporation into search results for a user to indicate one or more restaurants that are recommended by one or more friends of the user, for example).

In another example, the protected data 514 may be received from the second client 518 (e.g., an application acting on behalf of a user Emily) that may be requesting access to content within the protected data 514. A second access level to the protected data 514 may be determined for the second client 518 based upon evaluating the second client 518 against the set of access policies. For example, the application acting on behalf of the user Emily may be evaluated against an Emily policy 508 to determine a partial access level to content associated with Emily and friends of Emily 510. In this way, second content 520 within the protected data 514 may be provided to the second client 518. For example, social network data for Emily and friends of Emily (e.g., but not social network data of other users) may be provided to the application acting on behalf of Emily. The data protector 502 may provide sustained data protection for the protected data 514 because clients may be unable to access content within the protected data 514 without obtaining access through the data protector 502.

Figure 6:
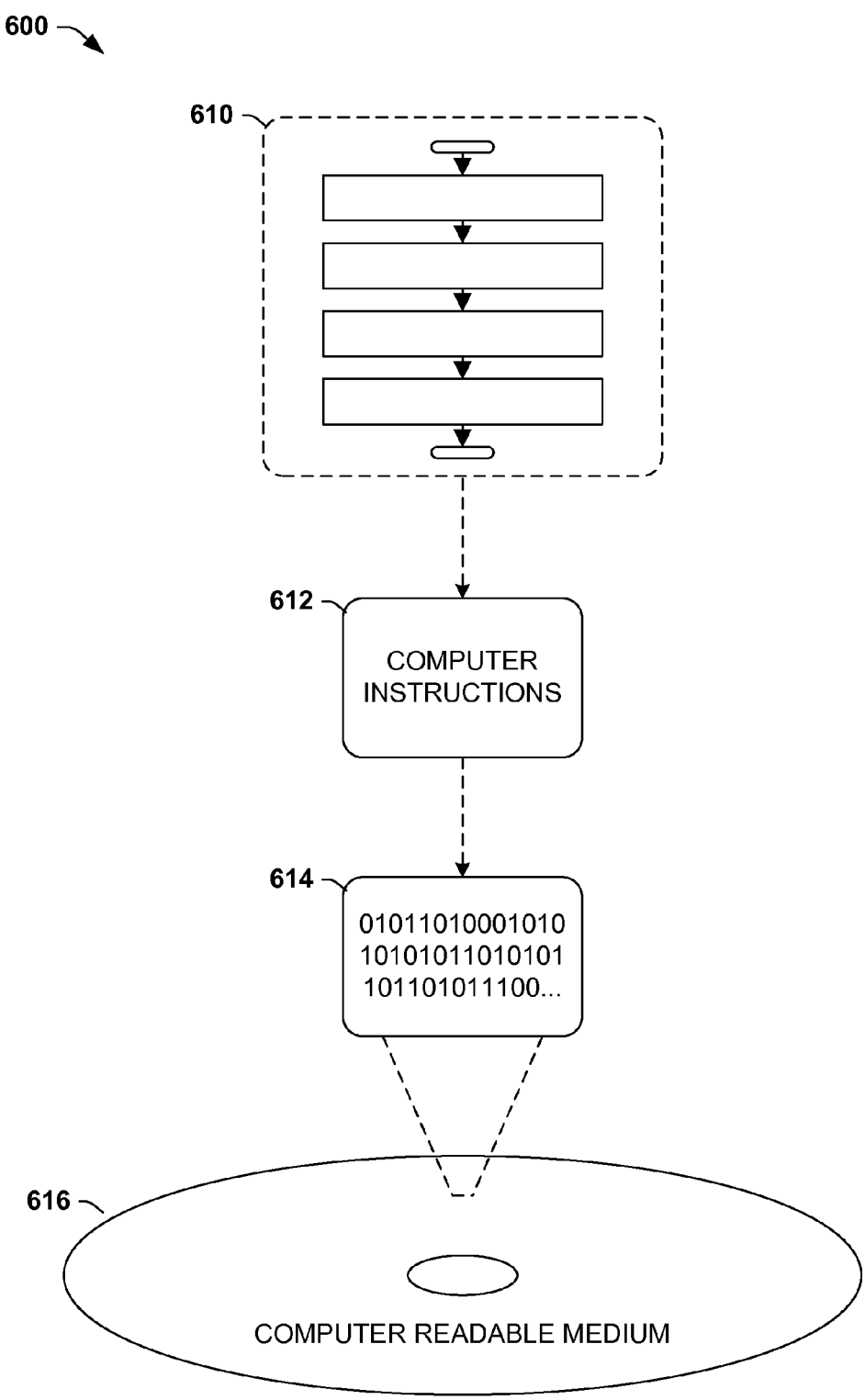
FIG. 6 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 616 (e.g., a CD-R, DVD-R, or a platter of a hard disk drive), on which is encoded computer-readable data 614. This computer-readable data 614 in turn comprises a set of computer instructions 612 configured to operate according to one or more of the principles set forth herein. In one such embodiment 600, the processor-executable computer instructions 612 may be configured to perform a method 610, such as at least some of the exemplary method 100 of FIG. 1 and/or at least some of exemplary method 200 of FIG. 2, for example. In another such embodiment, the processor-executable instructions 612 may be configured to implement a system, such as at least some of the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
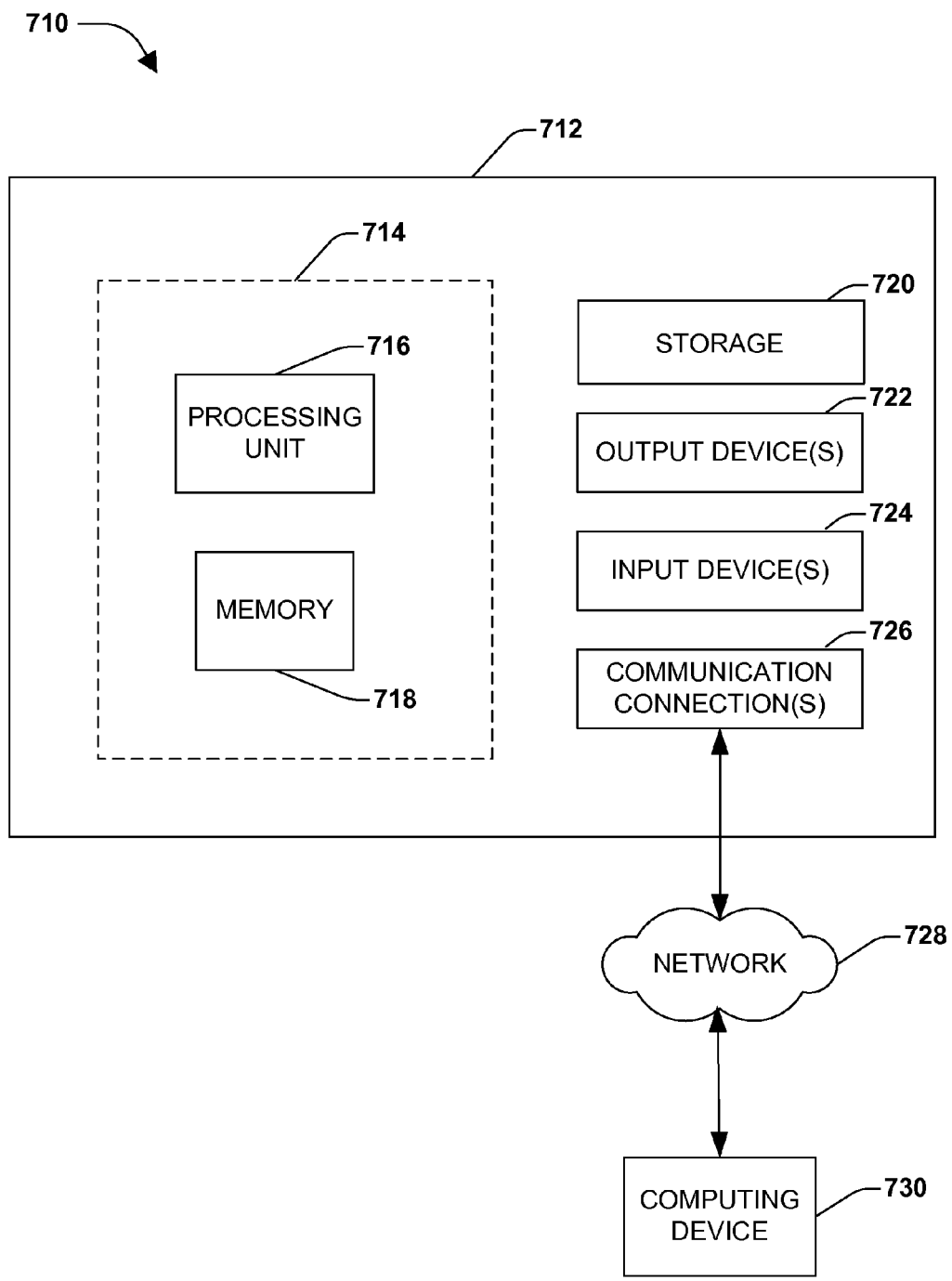
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1374), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for sustained data protection, comprising:
   receiving, at a data protector, protected data from a client requesting access to content within the protected data;
   determining, by the data protector, an access level to the protected data for the client based upon evaluating the client against a set of access policies; and
   evaluating the first client against a set of write permission to determine whether the first client has permission to protect one or more portions of the data; and
   upon determining that the client has permission to access at least a first portion of the protected data, extracting, by the data protector, at least some the first portion of the protected data according to the access level to generate extracted content; and
   providing, from the data protector, content to the client.

2. The method of claim 1, the access level comprising at least one of:
   a full access level; or
   a partial access level to less than all the content within the protected data.

3. The method of claim 1, comprising:
   receiving the protected data from a second client requesting access to the content within the protected data;
   determining a second access level to the protected data for the second client based upon evaluating the second client against the set of access policies, the second access level for the second client different than the access level for the client;
   extracting at least some of the content within the protected data according to the second access level to generate second extracted content; and
   providing the second extracted content to the second client, the second extracted content different than the extracted content.

4. The method of claim 1, the protected data inaccessible to the client without access as defined by the access level.

5. The method of claim 1, at least one of the receiving, the determining, the extracting, or the providing occurring external to a data retrieval storage layer.

6. The method of claim 1, the extracting comprising performing a decryption operation.

7. The method of claim 1, the protected data corresponding to social network data.

8. A computer readable memory device comprising instructions that when executed perform a method, comprising:
   receiving, at a data protector, data from a first client requesting protection of the data;
   specifying one or more access levels associated with content within the data using a set of access policies;
   securing the data to create protected data; and
   evaluating the first client against a set of write permission to determine whether the first client has permission to protect one or more portions of the data; and
   upon determining that the client has permission to protect a first portion of the protected data, including the first portion of the data within the protected data;
   providing, from the data protector, the protected data to the first client;
   receiving, at the data protector, the protected data from a second client requesting access to the content within the protected data;
   determining, by the data protector, at least some of the content within the protected data according to the access level to generate content; and
   providing, from the data protector, the extracted content to the second client.

9. The computer readable memory device of claim 8, the specifying one or more access levels comprising: specifying a first access level for a first portion of the content within the data; and specifying a second access level for a second portion of the content within the data, the second portion of the content different than the first portion of the content.

10. The computer readable memory device of claim 8, the securing the data comprising performing an: encryption operation.

11. The computer readable memory device of claim 8, the securing the data further comprises: upon determining that the client does not have permission to protect the first portion of the data, excluding the first portion of the data from the protected data.

12. The computer readable memory device of claim 8, the protected data corresponding to social network data.

13. The computer readable memory device of claim 8, the protected data inaccessible to the second client without access as defined by the access level.

14. A system for sustained data protection, comprising:
a data protector configured to:
define a set of access levels associated with content within data received from a client using a set of access policies;
secure one or more portions of the data that the client has permission to protect to create protected data, comprising:
evaluate whether the first client against a set of write permission to determine whether the first client has permission to protect one or more portions of the data; and
upon determining that the client has permission to secure a first portion of the protected data, include the first portion of the data as protected data; and
provide the protected data to the client;
receive the protected data from a second client requesting access to the content within the protected data;
determine an access level to the protected data for the second client based upon evaluating the second client against the set of access policies;
extracting at least some of the content within the protected data according to the access level to generate content; and
provide the extracted content to the second client.

15. The system of claim 14, the data protector configured to:
provide the second client with access to less than all the content within the protected data based upon the access level comprising a partial access level.

16. The system of claim 14, the data protector configured to:
extract at least some of the content within the protected data according to a second access level to the protected data for a third client to generate second extracted content; and
provide the second extracted content to the third client.

17. The system of claim 16, the second extracted content different than the extracted content.

18. The system of claim 14, the data protector implemented within a data protection layer external to a data retrieval storage layer.

19. The system of claim 14, the data protector configured to be distributed among one or more clients within a distributed computing environment.

20. The system of claim 14, the protected data corresponding to social network data.

* * * * *